Dec. 14, 1926.

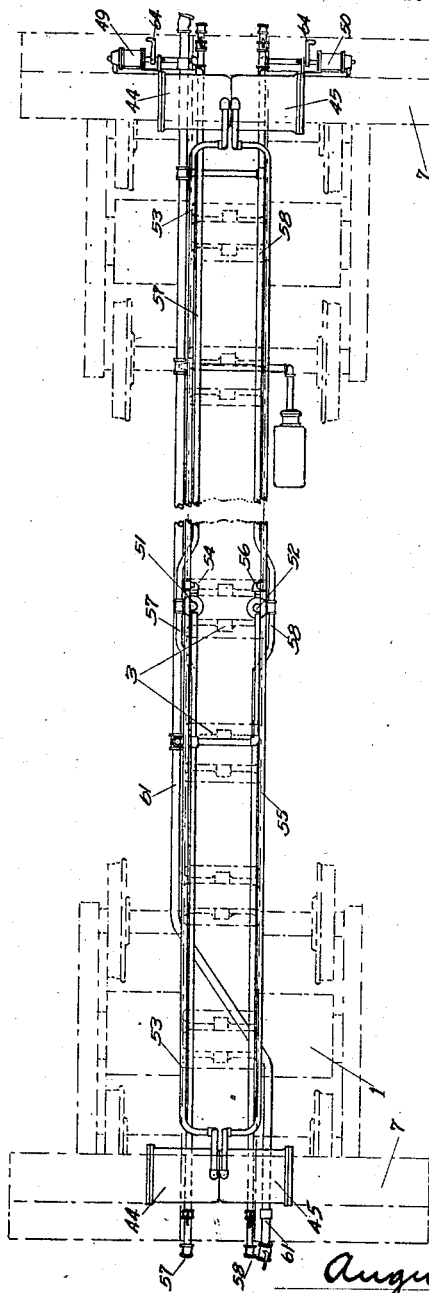

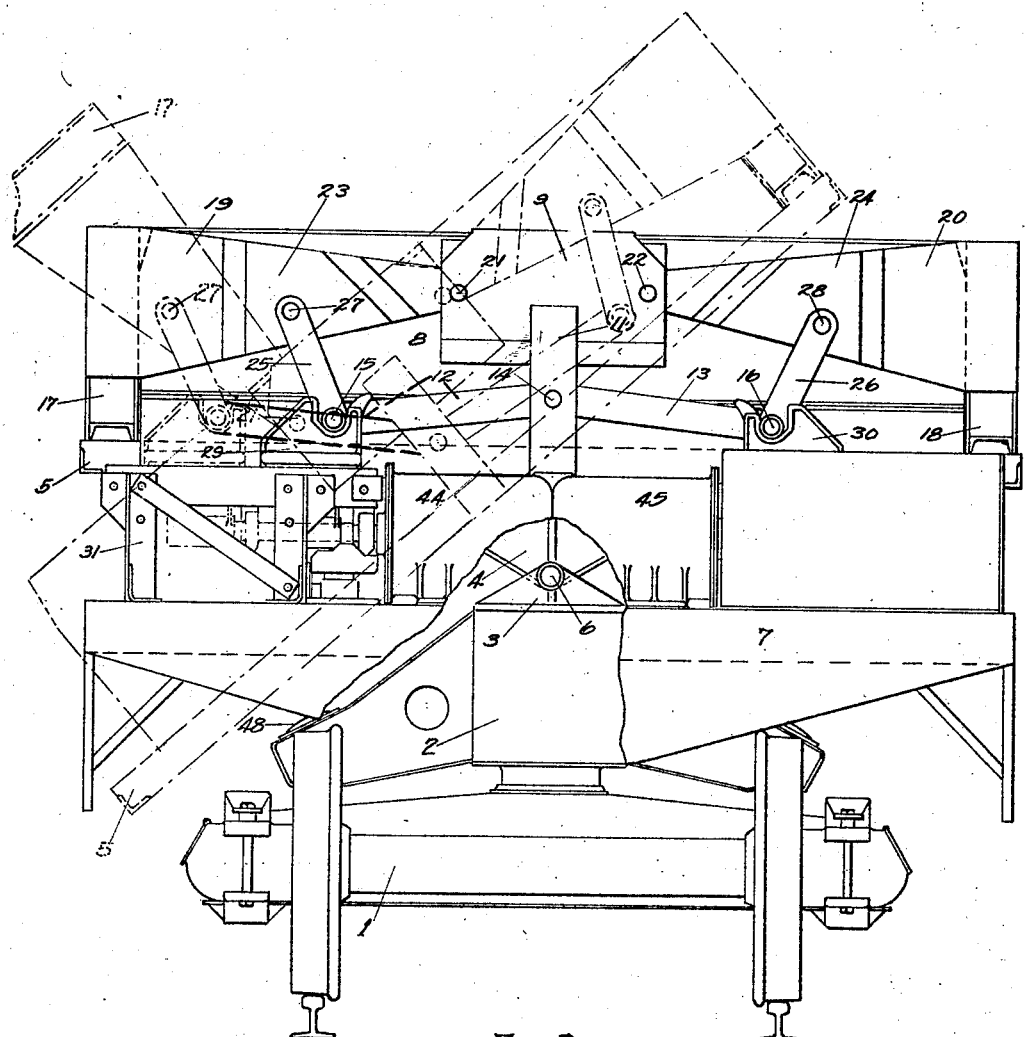

A. D. BOOTH ET AL 1,610,738

DUMPING VEHICLE

Filed June 6, 1921

Augustus D. Booth
Charles C. Martin
INVENTOR.

BY

Edwin P. Corbett
ATTORNEY.

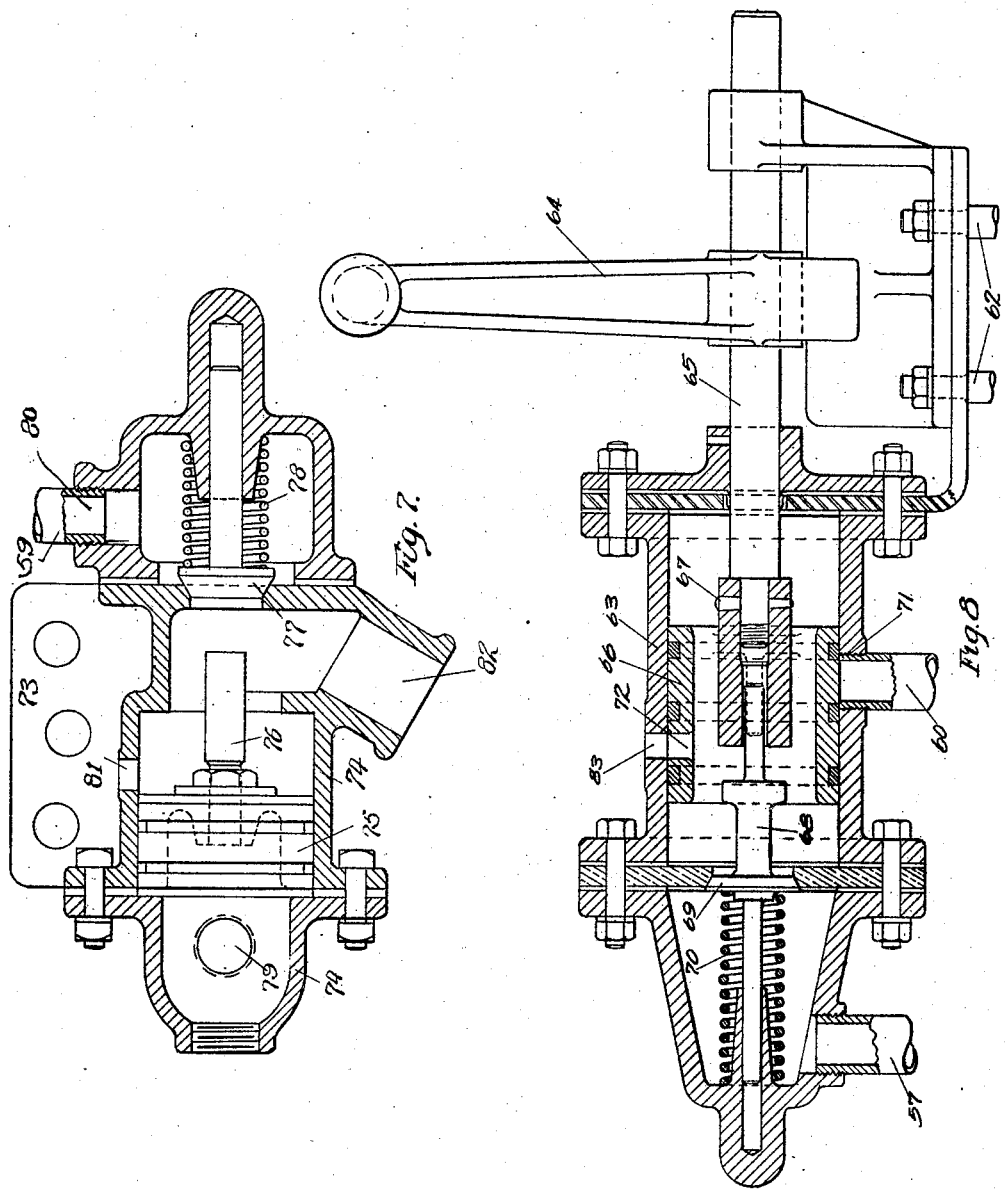

Patented Dec. 14, 1926.

1,610,738

UNITED STATES PATENT OFFICE.

AUGUSTUS D. BOOTH AND CHARLES C. MARTIN, OF COLUMBUS, OHIO.

DUMPING VEHICLE.

Application filed June 6, 1921. Serial No. 475,293.

Our invention relates to dumping vehicles and comprises a novel arrangement of means for positively dumping the vehicle body and simultaneously opening the doors thereof.

Previously, in dumping railway cars of this kind, an upright air cylinder has been placed at each side of the car and has been utilized for dumping and righting the car body. In this type of device, overbalancing of the car body is initiated by the cylinder on one side of the car and then the car body dumps of its own weight due to the shifted center of gravity. Return of the car body to normal position must be effected by positive operation of the cylinders beneath the lower side of the car body. The difficulty is that the center of gravity varies in different loads and an unbalanced load will frequently entirely defeat the result sought because the length of the piston stroke is necessarily too limited to shift the center of gravity sufficiently to ensure completion of dumping.

It has also been customary in the prior art to provide doors with opening mechanism that depends for initial operation upon an impact blow resulting from the tilting action. In this construction it is inevitable that the dumping action shall start before door opening is initiated so that sufficient force may be accumulated to ensure an impact blow of sufficient power. The disadvantages about this type of construction and operation is that the material in the car body is to a great extent dumped against the door before the opening is initiated.

Our invention contemplates the provision of a dumping vehicle wherein the dumping action and the door opening action will be power controlled throughout while the body and doors will be automatically returned to normal position by their own weight. We have provided a dump-car which is preferably fluid operated and which comprises a tiltable body movable in either direction about a central longitudinal axis and displaceable doors.

One phase of our invention consists in the provision of a means whereby the opening of the doors will be initiated simultaneously with the tilting of the car body. Furthermore, our structure is such that both the tilting of the car body and the opening of the car doors will be primarily effected, from beginning to end, by power operated means, although the weight of the overbalanced car body will also assist in attainment of the desired end.

Our car tilting mechanism and our door opening apparatus are desirably connected together and operated by the same power mechanism. Also, we have provided means for locking both the car tilting mechanism and the door opening apparatus. The connection between this mechanism and apparatus greatly facilitates locking because it makes easier the provision of a single locking device for both the mechanism and apparatus.

Our structure is such that the dumping of the car body and the opening of the car doors will result in shifting the center of gravity. This shifting of the center of gravity is such that as soon as the material is unloaded, the car will automatically come back to normal position. To ensure this, the air is released from our operating cylinders. Furthermore, our structure is such that restoration of the car body and doors to normal position will bring their operating mechanism and apparatus into subjection to the locking device that has been temporarily out of use.

The preferred embodiment of our invention is shown in the accompanying drawings wherein similar characters of reference designate corresponding parts and wherein Figure 1 is a plan view showing the dumping cylinders and piping system therefor and showing the end and under frame construction of the car in dot-dash lines.

Figure 2 is a side elevation of the dumping cylinders and piping system and showing the complete car and dumping mechanism in dot-dash lines.

Figure 3 is an end elevation of the dump car partly cut away, showing the car body tilting and door opening apparatus together with a means for locking these parts in normal position, this figure showing in dot-dash lines the position of the parts at dumping.

Figure 7 is a detail vertical cross-sectional view of our automatic air valve.

Figure 8 is a detail vertical cross-section of the hand operated valve for controlling the operation of the dumping cylinders.

Figure 4:
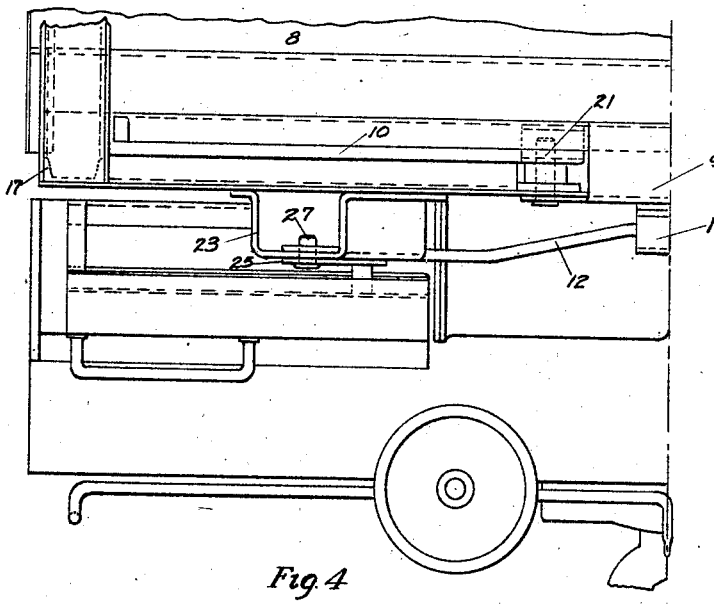
Figure 4 is a plan view of one half of one end of the two-way air dump car showing the dumping and door openings levers attached to the car body and car doors.

In the drawings, our invention is shown as comprising standard car trucks 1 carrying a center sill construction 2, having mounted at different intervals thereon pivot brackets 3. The brackets are adapted to engage with depending brackets 4 of a tiltable car body underframe 5 by means of pins 6. Car tilting and door opening mechanism together with a locking device and power means is mounted on both ends 7 of the car underframe construction. An air piping system is connected to the airbrake system of the train and is so arranged as to control the action of the tilting and door opening mechanism.

The car tilting mechanism, shown best in Figure 3, is mounted on each end of the tiltable car body 8. It comprises a gusset plate 9 secured to the car body ends 10 at a point adjacent the top center thereof, and an upright bearing plate 11 secured to the gusset plate 9 and the vertical car body ends 10. Pulling links 12 and 13 are pivotally secured to this upright plate 11 by means of a pivot pin 14. The outer ends of the pulling links 12 and 13 are provided with pins 15 and 16. The dot-dash lines show the position of the plates and pulling links when the car body is dumped.

Figure 6:
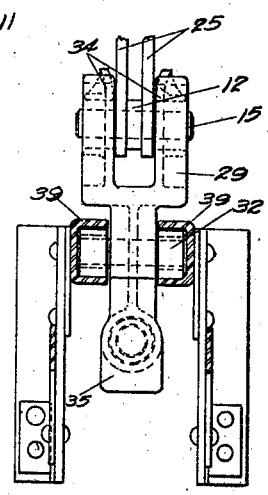
Figure 6 is a vertical cross-section on line A—A of Figure 5.

The door opening mechanism is illustrated in Figure 3, the solid lines showing the location of the doors 17 and 18 and opening mechanism in the normal position of the car body 8 and the dot-dash lines showing the location of the doors and opening mechanism in a dumped position of the car body. The doors 17 and 18 are pivotally mounted by means of arms 19 and 20 and pivot pins 21 and 22 to the gusset plate 9. Mounted on the arms 19 and 20 are the U-shaped brackets 23 and 24. Depending thrust links 25 and 26 are pivotally secured to the U-shaped brackets 23 and 24, the pivotal points 27 and 28 forming fulcrums about which the doors 17 and 18 are adapted to swing. Each of these links is preferably formed of two parallel bars as shown in Figure 6. The doors 17 and 18 are so designed that when one door is in the open position, as shown by the dotted lines of the door 17 in Figure 3, they will shift the center of gravity to the opposite side of the car body. The depending thrust links 25 and 26 are pivotally connected to the pulling links 12 and 13 by means of the connecting pins 15 and 16.

Figure 5:
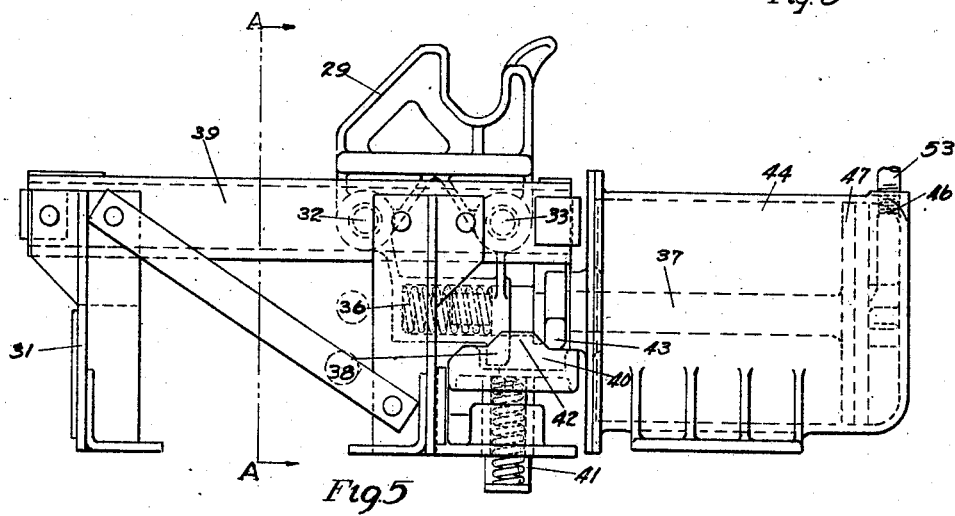
Figure 5 is a detail elevational view of a portion of the door opening and body tilting mechanism together with the lock therefor.

Carriages 29 and 30, adapted to engage the connecting pins 15 and 16, are mounted on the two ends 7 of the car under-frame by means of bracing construction 31, as best shown in Figures 5 and 6. The carriages comprise a bifurcate hook 34, shafts 32 and 33 carrying rollers thereon, and a downwardly extending portion 35 comprising a cylindrical hole 36 adapted to receive a spring and the end of a piston rod 37 and having a locking lug 38 at the bottom thereof. Channels 39 of the bracing construction 31 are so positioned as to form tracks to receive the rollers of the carriage shafts 32 and 33.

The locking device, best shown in Figure 5, is preferably designed for positively locking the car tilting and door opening mechanism in the normal position of the car body. It is secured to the underframe ends 7 and comprises a latch 40 recessed to receive the locking lugs 38 of the carriage 29 and is yieldably held in operable position by a spring 41. It is provided with a cam-like projection 42 adapted to engage with the laterally extending bosses 43 of the piston rod 37.

The power means designed to operate the tilting and door opening mechanism comprises horizontally opposed dumping cylinders 44 and 45 mounted on the ends 7 of the underframe construction of the car. An inlet and outlet opening 46 (Figure 5) admits and discharges air from behind the piston 47. The spring in the cylindrical hole 36 of the carriage 29 absorbs the lost motion of the piston rod 37. This lost motion is necessary to depress the latch 42 and unlock the carriage 29 before the carriage can be moved outwardly by the outward stroke of the piston rod.

In operation of this complete car dumping mechanism, the pistons 47 of the two similar cylinders 44, mounted on opposite ends 7 of the car underframe, are forced outwardly by the action of the high pressure air entering the inlet opening 46. As the piston rod 37 is forced outwardly, the boss 43 comes into contact with the cam-like projection 38 of the latch 40 and forces this latch downwardly against the tension of the spring 41. The disengaging of the lug 38 by the downward motion of the latch 42 permits of a free outward movement of the carriage 29 by the piston rod 37. Thus, as this outward movement progresses, the carriage 29, guided by the channel members 39, will simultaneously tilt the car body and open the door 17 to the position shown by the dot-dash lines in Figure 3. The carriage 29, being rigidly connected to the car body by means of the pin 15, the pulling link 12 and the pivot pin 14, the outward movement of the piston rod will be such as will effect a continuous pull on the car body during the period of dumping or until the car body base 5 strikes the bumper 48.

Also, the outward movement of the carriage 29 at each end of the car, will carry the link 25 outward toward the position 27, shown in dot-dash lines in Figure 3. At the same time, the plate 9 of the car body, tilted by means of the link 12, will carry the pivot point 21 downward about the axis formed by the pins 6. As the carriage progresses toward the completion of its outward stroke, the pivot 21 of the door arm 19 will assume a position 21 below the fulcrum 27, thus causing the door 17 to swing upward about the fulcrum 21 to a position practically parallel with the floor 5 of the tilted car body.

In the meantime, as the opposite side of the car body is tilted upwardly, the carriage 30 remaining stationary, the door 18 and arm 20 will likewise be carried upwardly. Thus, as the pulling link 13 and the link 26 are pulled to the left about the axis 6, the connecting pin 16 will automatically become disengaged from the stationary carriage 30. The car body and door will remain in the position shown by the dot-dash lines in Figure 3 until the air pressure is released from behind the cylinder piston 47.

The car doors and opening mechanism are so designed that when the car body is in an empty dumped position and one door 17 in an open position, as shown by the dotted lines in Figure 3, the center of gravity will be shifted to the opposite side of the car whereby the door 17, the empty car body and carriage 29 will automatically be returned to normal position.

As the car body reaches the normal position, the pin 16 will re-engage with the carriage 30, and the latch 40, released by the boss 43, will engage the lug 38, thus locking the car tilting and door opening mechanism until further outward movement of the piston rod 37.

The air actuated system comprises the dumping cylinders 44 and 45, arranged horizontally in pairs at each end of the car, which comprises an inlet and outlet opening 46, a piston 47 and a piston rod 37. These cylinders are controlled by means of hand operated valves 49 and 50, the automatically operating valves 51 and 52 and the connecting piping thereof, best shown in Figures 1 and 2. The two cylinders 44, at opposite ends but on the same half of the dump car are provided with a supply pipe 53 connected by means of a depending pipe 54 to the automatically operating valve 51 and the two opposing cylinders 45 are provided with a similar supply pipe 55 connected by means of a depending pipe 56 to an automatic operating valve 52. The operating pipes 57 and 58 connect the automatic valve 51 to the hand operated valve 49 and the automatic valve 52 to the hand operated valve 50 and extend the full length of the dump car, being adapted to be connected to the operating pipes of an adjacent dump car. Connected by branch pipes 59 and 60 to the automatic valves 51 and 52 and the hand operated valves 49 and 50, respectively, is the standard branch pipe 61 of the train.

The hand operated valves 49 and 50 may be secured to the end construction of the dump car by means of the bolts 62 (see Figure 8) and comprises a valve body 63, an operating lever 64, secured to the shaft 65, and a sleeve 66 secured to the shaft 65 by means of the tapered pin 67. A valve stem 68 is adapted to be engaged by the end construction of the shaft 65 and a valve 69, attached to the valve stem 68, is normally held on its seat by the spring 70. An outlet opening above the valve 69 is adapted to receive the operating pipe line 57 and an inlet opening 71 is appropriately placed so as to be closed or opened by a movement of the sleeve 66 and adapted to receive a branch 60 of the air brake pipe line 61. An exhaust opening is appropriately located in the valve body 63 so as to register with the port 72 of the valve sleeve 66, this exhaust opening being designated 83.

The automatic operating valves 51 and 52 are mounted on the center sill 2 of the dumping vehicle by means of the plate 73 (see Figure 7) and each comprises a valve body 74, a valve piston 75, and a plunger 76 adjustably mounted on said valve piston 75. A valve and valve stem 77 is adapted to be raised by the plunger 76 and held in normal relation to its seat by a spring 78. An inlet opening 79 in the valve base is adapted to receive the operating pipe 57 or 58, an inlet opening 80 located in the valve dome receives a branch 59 of the airbrake pipe line 61, an exhaust opening 81 is appropriately located in the valve body so as to be covered by upward movement of the valve piston 75, and an outlet opening 82 is located between the valve piston 75 and the valve 77 and adapted to receive the cylinder supply pipe 53 or 55.

In the operation of this air piping and controlling system, the manual operation of the valve lever 64 of the hand operating valve 49 will move the valve sleeve 66 (see Figure 8) to the left and consequently uncover the inlet opening 71, thus permitting the admission of high pressure air, from the airbrake pipe line 60, into the valve chamber. The end of the shaft 65 striking the valve stem 68 will move the valve 69 off its seat, against the tension of the spring 70 and, thus, will permit the high pressure air to enter the operating pipe line 57.

This high pressure air entering the base of the automatic operating valve 51 through the opening 79 will result in a vertical movement of the valve piston 75 whereby the plunger will force the valve 77 off its seat against the pressure of air in the valve dome and thus allow the high pressure air from the airbrake pipe line 59 to pass through the valve port 77, out through the outlet opening 82 and into the cylinder supply pipe lines 54 and 53 and into the inlet 46 of the cylinder 44. The piston 75 in its upward position has a greater effective area on its bottom side than on its upper side and is thus held in operative position as long as the hand operated valve is open.

The operation of the piping and valves on the other half of the car is preferably identical with the operation just described, the tilting and righting of the car body being accomplished by means of the hand operated valve on the side that is desired to be tilted.

It will be obvious from the above that we have provided a dumping vehicle of highly novel form. Its construction is such that the tilting of the car body and the opening of the doors will be initiated simultaneously and the doors will move more rapidly than the car body will tilt at this initiation. Furthermore, these doors will swing quickly to a position of widest opening and, with this swinging to open position, will so change the center of gravity that the car body will automatically right itself as soon as it is relieved of the matter in it and of the air pressure tending to hold it in dumped position.

Our construction is such that both the opening of the doors and the tilting of the car body are effected by power mechanism which is entirely removed from the path of dumping, being placed upon the ends of the car rather than upon the sides. In addition, both the car doors and the car body are normally located in upright position, this being preferably accomplished through the medium of a single lock for the doors and car body operating mechanism. This latch or lock is a single and extremely efficacious means for positively locking the doors and car body in normal position and is adapted to be released automatically by the operation of the power means for opening the doors and tilting the body. It will be further apparent that the doors are swung about fulcrums that are not lowered in the operation and that, in fact, may be raised to some extent. The mechanism is so constructed and so mounted that the swaying of the car cannot possibly produce any accidental displacement of the doors. Many other features of advantage have been set forth and will be claimed.

Another important aspect of our invention arises from the fact that we tilt the vehicle body by a pulling action. This makes it possible to avoid practically all lost motion for the reason that we are able to provide a structure which pulls the car body to one side and at the same time separates the actuating parts on the other side of the body.

Having thus described our invention, what we claim is:

1. A dumping vehicle comprising a tiltable body, doors designed to open, and means mounted on the end of said vehicle for simultaneously initiating tilting of said body and opening one of said doors.

2. A dumping vehicle comprising a tiltable body, doors designed to open, and a single power operated means for tilting said body and simultaneously and positively opening one of said doors.

3. A dumping vehicle comprising a tiltable body, and power means supported at the ends of the vehicle for tilting said vehicle of such construction that it can follow the tilting action all the way through and positively maintain the body tilted or allow the body to automatically return to normal position upon its release.

4. A dumping vehicle comprising a tiltable body, a door designed to open, and means for tilting said body and opening said door, said means being such that when operated it is in direct connection with the door and the door starts to open simultaneously with initiation of tilting.

5. A dumping vehicle comprising a tiltable body, doors designed to open and power operated means for directly opening either one of said doors.

6. A dumping vehicle comprising a tiltable body, doors designed to open and power operated means engageable with said doors for opening either one of said doors simultaneously with the tilting of said body.

7. A dumping vehicle comprising a tiltable body, a door pivoted to said body, a fulcrum about which said door is tilted, and means for raising said fulcrum during the tilting of the door.

8. A dumping vehicle comprising a tiltable body, a door pivoted to said body, a movable fulcrum about which said door is tilted, and means for moving said fulcrum and preventing lowering of said fulcrum relative to its normal position.

9. A dumping vehicle comprising a tiltable body, a door pivoted to said body, a fulcrum element so connected to the door that tilting of the body will open the door, and power operated means for positively and directly moving said fulcrum during the entire tilting action.

10. A dumping vehicle comprising a tiltable body, a door pivoted to said body, a fulcrum element so connected to the door that tilting of the body will open the door, and power operated means directly connected to said fulcrum for moving and raising said fulcrum during said tilting action.

11. A dumping vehicle comprising a tiltable body, means for tilting said body, and a door so designed and pivoted to said body that said body will automatically return to normal position upon release of said means.

12. A dumping vehicle comprising a tiltable body, a door, means for opening said door, said door being so designed and pivoted to said body that said body will automatically return to normal position upon release of said means.

13. A dumping vehicle comprising a body tiltable about a longitudinal axis, a door, means for tilting said body and opening said door, the parts being so arranged that when said means is rendered inoperative the body and door will return to normal position of their own weight.

14. A dumping vehicle comprising a tiltable body, a door pivoted to said body, and a movable fulcrum about which said door is opened whereby the door in open position will automatically shift the center of gravity of the empty vehicle body to the side opposite the side dumped.

15. A dumping vehicle comprising a tiltable body, a door designed to be raised, and means for simultaneously raising the door and tilting the body, said means being of such a nature that during the first part of the tilting action the door will be raised a greater amount of its complete raising stroke than the corresponding relative amount of dumping of the body.

16. A dumping vehicle comprising a tiltable body, doors pivoted to said body, reciprocating mechanism mounted on said dumping vehicle and movable carriages connecting said receprocating mechanism with said vehicle body.

17. A dumping vehicle comprising a tiltable body, doors pivoted to said vehicle body, reciprocating mechanism mounted on said dumping vehicle and movable carriages connecting said reciprocating mechanism with said vehicle body and said doors.

18. A dumping vehicle comprising a tiltable body, doors pivoted to said body, reciprocating mechanism mounted on the end of said dumping vehicle and movable carriages connecting said reciprocating mechanism with said vehicle body and said doors.

19. A dumping vehicle comprising a body, means mounted opposite the ends thereof adapted to tilt the body, and means positioned to engage with said means for locking said vehicle body in normal position.

20. A dumping vehicle comprising a tiltable body and displaceable doors and power operated means in continuous connection with said body and doors for tilting said body and opening said doors whereby said means will exert a continuous pull on said body.

21. A dumping vehicle comprising a body tiltable about a longitudinal axis and power operated means mounted on the end of said dumping vehicle for tilting said body whereby said means will exert a continuous pull on said body until said means is rendered inoperative.

22. A dumping vehicle comprising a body tiltable about a longitudinal axis and power operated means mounted on the end of said dumping vehicle and so arranged for tilting said body that said means will positively tilt and exert a continuous pull on said body.

23. A dumping vehicle comprising a body tiltable about a longitudinal axis and power operated means mounted on the end of said dumping vehicle and so arranged for tilting said body that said means will positively tilt and exert a continuous pull on said body until said means is rendered inoperative.

24. A dumping vehicle comprising a body tiltable in either direction about a longitudinal axis and power operated means mounted on the end of said dumping vehicle and so arranged for tilting said body that said means will positively tilt and exert a continuous pull on said body until said means is rendered inoperative.

25. A dumping vehicle comprising a body tiltable in either direction about a longitudinal axis and means mounted on the end of said dumping vehicle for tilting said body, of such construction that it will positively tilt said body and continue to pull the body all through the tilting action.

26. A dumping vehicle comprising a body tiltable in either direction about a longitudinal axis and power operated means mounted on the end of said dumping vehicle for tilting said body, of such construction that it will positively tilt the body and continue to pull said body all through the tilting action.

27. A dumping vehicle comprising a tiltable body, doors pivoted to said body and power operated means mounted on the end of said dumping vehicle for tilting said body and opening said doors, of such a construction that it will exert a continuous pull on said body and move said doors, until said power is released.

28. A dumping vehicle comprising a tiltable body, doors pivoted to said body, fluid operated pistons mounted on each end of said dumping vehicle and carriages connecting said pistons with said body and pivoted doors.

29. A dumping vehicle comprising a tiltable body, doors pivoted to said body, fluid operated pistons mounted horizontally on each end of said dumping vehicle and carriages connecting said pistons with said body and pivoted doors.

30. A dumping vehicle comprising a tiltable body, doors pivoted to said body, a fluid operated piston mounted horizontally on each end of said dumping vehicle and carriages provided with tracks for connecting said pistons with said body and pivoted doors.

31. A dumping vehicle, a tiltable body, doors pivoted to said body and adapted to move upwardly and fluid operated pistons similarly mounted on each end of said dumping vehicle, said pistons being adapted to cooperatively tilt said body and simultaneously open and close said pivoted doors.

32. A dumping vehicle comprising a tiltable body, a door pivoted to said body, a fluid operated piston for dumping said body, a carriage adapted to engage with said piston and a link pivotally connecting said carriage with said pivoted door whereby the point of connection of said link and said door forms a fulcrum about which said door is adapted to swing.

33. A dumping vehicle comprising a tiltable body, a door pivoted to said body, a member depending from said door, a dumping link pivoted to said body, means connecting said depending member with said dumping link and a movable carriage adapted to engage said means.

34. A dumping vehicle comprising a tiltable body, a door pivoted to said body, fluid operated pistons mounted on each end of said dumping vehicle for cooperatively tilting said body and opening said door, carriages connecting said pistons with said body and pivoted door, and latches normally engaging and locking said carriages.

35. A dumping vehicle comprising a tiltable body, a door pivoted to said body, fluid operated pistons mounted on each end of said dumping vehicle for cooperatively tilting said body and opening said door, carriages connecting said pistons with said body and pivoted door, latches normally engaging and locking said carriages and so positioned as to be rendered inoperative by an outward movement of said pistons.

36. A dumping vehicle comprising a tiltable body, a door pivoted to said body, power operated pistons mounted on the end of said dumping vehicle, a member depending from said door, a dumping link pivoted to said body, means connecting said depending member with said dumping link, and a movable carriage adapted to engage said means, said carriage having a depending arm adapted to engage with said piston whereby an outward movement of said piston will result in tilting said body and opening said pivoted door.

37. A dumping vehicle comprising a tiltable body, a door pivoted to said body, a depending member pivoted to said door, said pivot thereby forming a fulcrum about which said door is adapted to swing, a dumping link pivoted to said body, means connecting said depending member with said dumping link, power operated pistons mounted on each end of said dumping vehicle, and movable carriages positioned to be actuated by said pistons and adapted to engage said means, the movement of which will dump said body and raise said door.

38. A dumping vehicle comprising a tiltable body, a door pivoted to said body, a depending member pivoted to said door, said pivot thereby forming a fulcrum about which said door is adapted to swing, a dumping lever pivoted to said body, means connecting said depending member with said dumping link, power operated pistons mounted on each end of said dumping vehicle, and movable carriages adapted to engage said means and positioned to be actuated by said pistons whereby the resulting movement of said means will pull said dumping lever thus tilting the vehicle, and will move said fulcrum and open said door to such a position that it will suffice to right the vehicle body upon removal of power from said piston.

39. A dumping vehicle comprising a displaceable door, a power operated thrust rod for opening said door, and means for locking said thrust rod.

40. A dumping vehicle comprising a tiltable body, a door opening mechanism, a body tilting mechanism and a single means for locking both independently of said body.

41. A dumping vehicle comprising a door opening mechanism, a vehicle tilting mechanism, power operated means for directly operating both of said mechanisms and means for locking both of said mechanisms.

42. A dumping vehicle comprising a door opening mechanism, a vehicle tilting mechanism, power operated means for directly operating both of said mechanisms and means for locking said door opening mechanism.

43. A dumping vehicle comprising a door opening mechanism, a vehicle tilting mechanism, power operated means for directly operating both of said mechanisms and means for locking said vehicle tilting mechanism.

44. A dumping vehicle comprising a tiltable body, displaceable doors, power operated means, means directly connecting said vehicle body and said doors with said power operated means and means for locking said body.

45. A dumping vehicle comprising a tiltable body, displaceable doors, power operated means, means directly connecting said vehicle body and said doors with said power operated means and means for locking said displaceable doors.

46. A dumping vehicle comprising a tiltable body, displaceable doors, power operated means, means directly connecting said body and said doors with said power operated means and means for locking said second-named means.

47. A dumping vehicle comprising a door opening mechanism, a vehicle tilting mechanism, means connecting both and means for locking said connecting means.

48. A dumping vehicle comprising a door opening mechanism, a body tilting mechanism, means supporting both, power means adapted to actuate said means, a latch normally locking said first means and means within said supporting means for absorbing necessary lost motion in said power means.

49. A dumping vehicle comprising a door opening mechanism, a body tilting mechanism, means supporting both, power means adapted to actuate said means, a latch normally locking said first-named means and operable by said power means, and means within said supporting means for absorbing necessary lost motion in said power means.

50. A dumping vehicle comprising a tiltable body, displaceable doors and means for simultaneously applying force to either side of said body and to one of said doors and at the same time separating the operating elements on the opposite side.

51. A dumping vehicle comprising body tilting mechanism, door opening mechanism and means on each side of said vehicle for simultaneously operating both of said mechanisms whereby the initiation of said means on one side will separate the means on the opposite side from the said mechanism.

52. A dumping vehicle comprising a tiltable body, displaceable doors, and power operated means for exerting a pulling action on said body and simultaneously opening one of said doors, said means being in continuous connection with said body and said door.

53. A dumping vehicle comprising a body tiltable to either side, means carried by the body to assist in tilting, means carried by the underframe to operate said last means, said two means being automatically separable on one side of the vehicle when the body is dumped to the other side.

54. A dumping vehicle comprising a body tiltable to either side, means carried by the body to assist in tilting, means carried by the underframe to operate said last means, said two means being constructed to pull the body into dumping position on one side and to separate on the other side of the vehicle.

55. A dumping vehicle comprising a body tiltable to either side, displaceable doors, means carried by the body to assist in tilting said body and opening said doors, means carried by the underframe to operate said last means, said two means being automatically separable on one side of the vehicle when the body is dumped to the other side.

56. A dumping vehicle comprising a body tiltable to either side, displaceable doors, means carried by the body to assist in tilting said body and opening said doors, means carried by the underframe to operate said last means, said two means being constructed to pull the body into dumping position on one side and to separate on the other side of the vehicle.

57. In a dumping vehicle, a body tilting mechanism, a door opening means, and a means for retaining said mechanism and means, said last-named means being such as to tilt the body to either side and open the door on such side by a pulling action and yet permit unobstructed separation therefrom of said body tilting mechanism and door opening means on the opposite side, and means for operating said last-named means.

58. In a dumping vehicle, a body tilting mechanism, a door opening means, and a means for retaining said mechanism and means, said last-named means being constructed to permit separation of said mechanism and means therefrom when the car side is raised to effect dumping toward the opposite side but being operative to pull said mechanism and means when moved.

59. In a dumping vehicle, a body tilting mechanism, a means for retaining said mechanism, said means being such as to tilt the body to either side by a pulling action and yet permit unobstructed separation therefrom of the body tilting mechanism on the opposite side, and means for operating said last-named means.

60. In a dumping vehicle, a body tilting mechanism, a means for retaining said mechanism, said means being constructed to permit separation of said mechanism therefrom when the car side is raised to effect dumping toward the opposite side but being operative to pull said mechanism when moved.

61. A dumping vehicle comprising a tiltable body, displaceable doors, an arm carrying each of said doors and pivoted to the body, a depending link pivoted to said arm and bodily movable means mounted on the end of said vehicle for directly moving said link to open said doors.

62. A dumping vehicle comprising a tiltable body, displaceable doors, an arm carrying each of said doors and pivoted to the body, a depending link pivoted to said arm and power operated means mounted on the end of said vehicle for directly controlling the motion of said link.

63. A dumping vehicle comprising a tiltable body, doors pivoted to said body, and a single means for simultaneously tilting said body and opening one of said doors, said means being in continuous connection with said body and said door.

In testimony whereof we hereby affix our signatures.

AUGUSTUS D. BOOTH.
CHARLES C. MARTIN.